US012683672B2

(12) United States Patent (10) Patent No.: US 12,683,672 B2
Maleki et al. (45) Date of Patent: Jul. 14, 2026

(54) WIRELESS COMMUNICATIONS DEVICE AND METHODS FOR BEAM TRAINING IN A WIRELESS COMMUNICATIONS NETWORK

(71) Applicant: Telefonaktiebolaget LM Ericsson (publ), Stockholm (SE)

(72) Inventors: Sina Maleki, Malmö (SE); Muris Sarajlic, Malmö (SE); Joao Vieira, Hjärup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 18/711,766

(22) PCT Filed: Nov. 29, 2021

(86) PCT No.: PCT/EP2021/083380
§ 371 (c)(1),
(2) Date: May 20, 2024

(87) PCT Pub. No.: WO2023/094012
PCT Pub. Date: Jun. 1, 2023

(65) Prior Publication Data
US 2025/0038821 A1 Jan. 30, 2025

(51) Int. Cl.
*H04B 7/06* (2006.01)
*H04B 7/04* (2017.01)
(52) U.S. Cl.
CPC ..... *H04B 7/06952* (2023.05); *H04B 7/04026* (2023.05)
(58) Field of Classification Search
None
See application file for complete search history.

(56) References Cited

U.S. PATENT DOCUMENTS

| 11,271,699 | B1 * | 3/2022 | Eyuboglu | ............ | H04J 11/0073 |
| 11,375,527 | B1 * | 6/2022 | Eyuboglu | .......... | H04B 7/15528 |

(Continued)

FOREIGN PATENT DOCUMENTS

| EP | 4184993 | A1 * | 5/2023 | ............ | H04W 52/42 |
| EP | 3818643 | B1 * | 7/2025 | .......... | H04B 17/309 |
| WO | 2021027750 | A1 | 2/2021 | | |

OTHER PUBLICATIONS

International Search Report and Written Opinion of the International Searching Authority, PCT/EP2021/083380, mailed Aug. 10, 2022, 15 pages.

(Continued)

*Primary Examiner* — Sujoy K Kundu
*Assistant Examiner* — Vladislav Y Agureyev
(74) *Attorney, Agent, or Firm* — Sage Patent Group

(57) ABSTRACT

A method, performed by a wireless communications device, for beam training with a radio access network of a wireless communications system. The wireless communications device is configured with a first set of multiple beams for a first beam training and a second set of multiple beams for a second beam training. The second set is different from the first set, the method including:
performing the first beam training with the first set of multiple beams;
calculating a channel metric associated with the wireless communications device based on the performed first beam training with the first set;
selecting, for the second beam training, a subset of beams of the second set based on the calculated channel metric; and
performing the second beam training with the selected subset.

14 Claims, 10 Drawing Sheets

(56) References Cited

U.S. PATENT DOCUMENTS

| 11,838,151 | B1* | 12/2023 | Jones | ................ | H04L 25/0224 |
|---|---|---|---|---|---|
| 2018/0183507 | A1 | 6/2018 | Franz et al. | | |
| 2020/0007222 | A1* | 1/2020 | Ruder | ................ | H04B 7/0837 |
| 2020/0128436 | A1 | 4/2020 | Chae et al. | | |
| 2020/0204237 | A1* | 6/2020 | Zhou | ................ | H04B 7/0408 |
| 2020/0367230 | A1* | 11/2020 | Raghavan | ........... | H04W 72/044 |
| 2020/0396685 | A1* | 12/2020 | Nam | ................ | H04W 16/28 |
| 2021/0067978 | A1 | 3/2021 | Cheraghi et al. | | |
| 2021/0146974 | A1* | 5/2021 | Wang | ................ | H04B 7/06952 |
| 2021/0152990 | A1* | 5/2021 | Pajovic | ............. | G01S 5/02525 |
| 2021/0184744 | A1* | 6/2021 | Pezeshki | ............. | H04L 5/0048 |
| 2021/0336687 | A1 | 10/2021 | Pezeshki et al. | | |
| 2022/0110004 | A1* | 4/2022 | Horn | ................ | H04B 7/06958 |
| 2022/0173848 | A1 | 6/2022 | Guan et al. | | |
| 2023/0057661 | A1* | 2/2023 | Awoniyi-Oteri | ...... | H04W 24/10 |
| 2023/0122731 | A1* | 4/2023 | Dutta | ................ | H04W 76/14 |
| | | | | | 370/329 |
| 2024/0236746 | A1* | 7/2024 | Li | ................ | H04B 7/0695 |
| 2024/0244636 | A1* | 7/2024 | Prasad | ................ | H04L 5/0035 |
| 2025/0007597 | A1* | 1/2025 | Zhu | ................ | H04B 7/0404 |

OTHER PUBLICATIONS

Sim, Soo Min et al., "Deep Learning-Based mmWave Beam Selection for 5G NR/6G With Sub-6 GHz Channel Information: Algorithms and Prototype Validation," IEEE, Digital Object Identifier 10.1109/ACCESS.2020.2980285, 2020, 13 pages.

Meira, Joao et al., "Deep Convolutional Neural Networks for Massive MIMO Fingerprint-Based Positioning," arXiv.1708.06235v1 [stat.ML], Aug. 21, 2017, 6 pages.

* cited by examiner

Radio front-end

121

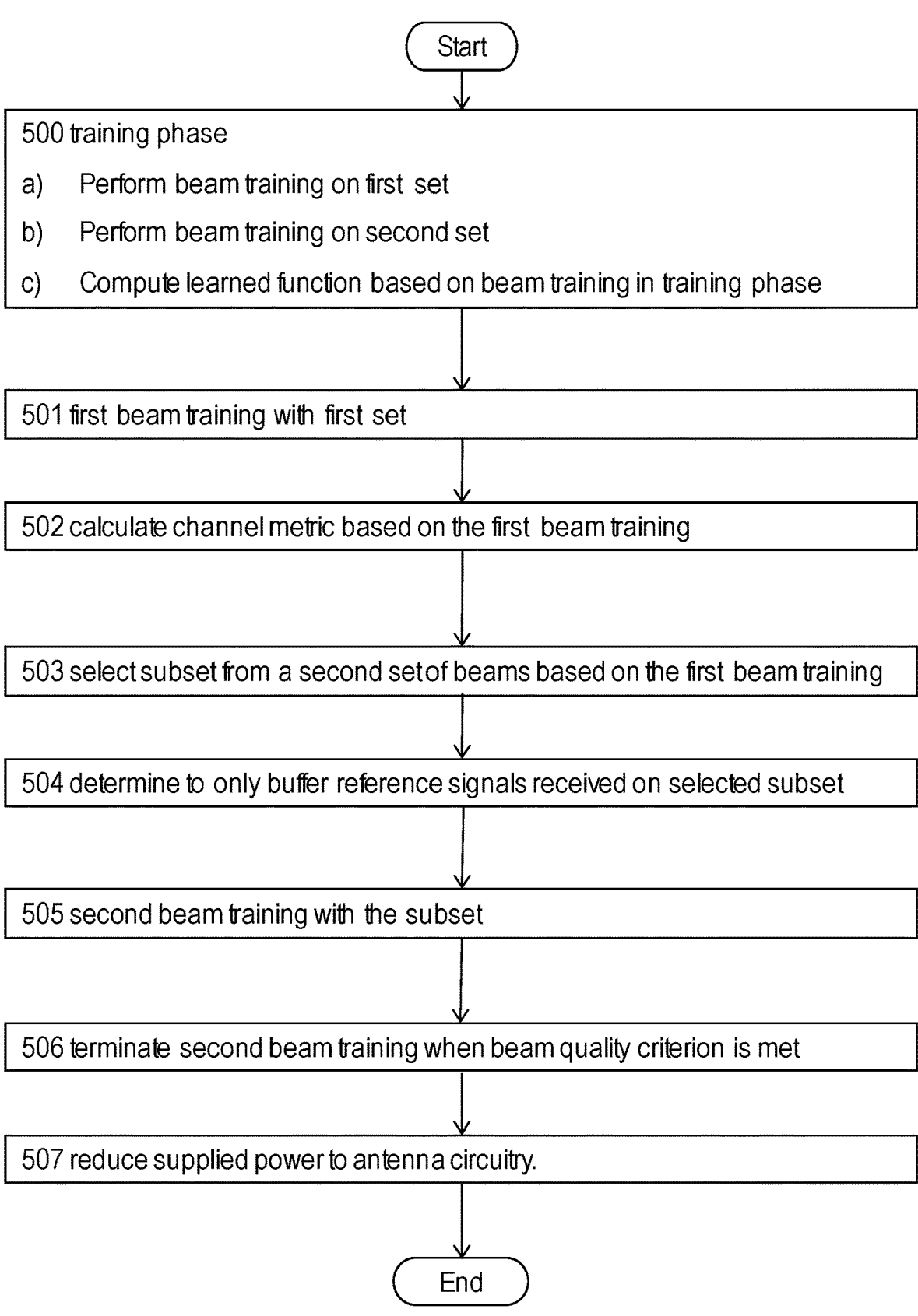

Start 500 training phase a)    Perform beam training on first set b)    Perform beam training on second set c)    Compute learned function based on beam training in training phase 501 first beam training with first set 502 calculate channel metric based on the first beam training 503 select subset from a second set of beams based on the first beam training 504 determine to only buffer reference signals received on selected subset 505 second beam training with the subset 506 terminate second beam training when beam quality criterion is met 507 reduce supplied power to antenna circuitry.

End

Fig.5

WIRELESS COMMUNICATIONS DEVICE AND METHODS FOR BEAM TRAINING IN A WIRELESS COMMUNICATIONS NETWORK

CROSS REFERENCE TO RELATED APPLICATIONS

This application is a 35 U.S.C. § 371 national stage application of PCT International Application No. PCT/EP2021/083380 filed on Nov. 29, 2021, the disclosure and content of which is incorporated by reference herein in its entirety.

TECHNICAL FIELD

The embodiments herein relate to a wireless communications device for beam training with a radio access network of a wireless communications system. A corresponding computer program and a computer program carrier are also disclosed.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas. Each service area or cell area may provide radio coverage via a beam or a beam group. Each service area or cell area is typically served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Wireless Communication Systems in 3GPP

FIG. 1 illustrates a simplified wireless communication system. Consider the simplified wireless communication system in FIG. 1, with a UE 12, which communicates with one or multiple access nodes 103-104, which in turn is connected to a network node 106. The access nodes 103-104 are part of the radio access network 10.

For wireless communication systems pursuant to 3GPP Evolved Packet System, (EPS), also referred to as Long Term Evolution, LTE, or 4G, standard specifications, such as specified in 3GPP TS 36.300 and related specifications, the access nodes 103-104 corresponds typically to Evolved NodeBs (eNBs) and the network node 106 corresponds typically to either a Mobility Management Entity (MME) and/or a Serving Gateway (SGW). The eNB is part of the radio access network 10, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 corresponds typically to an 5G NodeB (gNB) and the network node 106 corresponds typically to either an Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs may also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Beam Training for Wireless Communications Devices

When a UE, such as the UE 12, joins a new radio technology, e.g., finds a NR cell when entering its coverage, it typically searches among all its available beams in order to find one or more of the best beams, and then the UE uses those beams to get connected to the new radio technology. This process is known as beam training.

Furthermore, it may use the same beam for data reception or transmission, e.g. for reciprocal radio systems such as radio systems relying on Time Division Duplex (TDD).

A beam of the UE, or in other words a UE beam, is typically associated with a number of transmitter (Tx) and/or receiver (Rx) antennas/ports/panels and so on. An antenna port may be a logical unit which may comprise one or more antenna elements. An antenna panel may comprise of one or more antenna ports. For example, in frequency range 2 (FR2) a UE typically has two antenna panels such that if a hand covers one, the other panel is still available. E.g., the UE 12 may be configured with 8 Rx antenna ports, and thus it may produce up to 8 orthogonal beams. During beam training, the UE 12 sweeps through its beams in order to find the best ones for further communication with the radio system. Beam sweeping is typically performed in the time domain, i.e., the UE 12 does not train two or more beams at the same time, particularly due to the way that Reference Signals (RS), e.g., reference signals in a Synchronization Signal Block (SSB), are transmitted in a time sweep manner. The UE 12 may additionally be configured with multiple antenna panels, each comprising one or more antenna ports. For example, in frequency range 2 (FR2) the UE 12 may be configured with multiple antenna panels in order to improve the diversity, and thus within each panel it may also support multiple beams.

When the UE 12 moves between different radio technologies, frequency bands, etc., e.g., from LTE to NR, or from WiFi to NR unlicensed then the UE 12 by default searches for all the possible beams in the new radio technology or frequency band. A large time-frequency resource overhead is incurred when doing the beam training, in addition to an energy consumption overhead. The problem is exacerbated as new radio technologies are deployed in higher frequencies and therefore a number of potential beams that the UE 12 need to search also increases significantly, e.g., a NR UE in sub 6 GHz need to train in maximum 8 beams while in FR2, e.g., 24 GHz, it has to search among a maximum of 64 beams.

SUMMARY

A problem is how to reduce the large time-frequency resource overhead and the energy consumption overhead associated with beam training of wireless communications devices, such as UEs.

An object of embodiments herein may be to obviate some of the problems related to beam training of wireless communications devices, or at least reduce the impact of them.

Embodiments herein rely on techniques where wireless communications devices use previous beam training with a different set of beams in a different frequency band or with a different radio technology, to reduce the beam training overhead for a new frequency band and/or radio technology.

According to an aspect, the object is achieved by a method, performed by a wireless communications device, for beam training with a radio access network of a wireless communications system. The wireless communications device is configured with a first set of multiple beams for a first beam training and a second set of multiple beams for a second beam training. The second set is different from the first set.

The method comprises:

performing the first beam training with the first set of multiple beams;

calculating a channel metric associated with the wireless communications device based on the performed first beam training with the first set;

selecting, for the second beam training, a subset of beams of the second set based on the calculated channel metric; and performing the second beam training with the selected subset.

According to a further aspect, the object is achieved by a wireless communications device, such as a UE. The wireless communications device is configured with a first set of multiple beams for a first beam training and a second set of multiple beams for a second beam training. The second set is different from the first set. The wireless communications device is further configured to:

perform the first beam training with the first set of multiple beams;

4 calculate a channel metric associated with the wireless communications device based on the performed beam training with the first set;

select, for the second beam training, a subset of beams of the second set based on the calculated channel metric; and perform the second beam training with the selected subset.

According to a further aspect, the object is achieved by a computer program comprising computer readable code units, which when executed by a wireless communications device, causes the wireless communications device to perform actions according to any of the aspects above.

According to a further aspect, the object is achieved by a carrier comprising the computer program of the aspect above, wherein the carrier is one of an electronic signal, an optical signal, a radio signal and a computer readable medium. The carrier may also be one of an electromagnetic signal, a magnetic signal, an electric signal, a microwave signal.

Since the wireless communications device performs the second beam training with the selected subset the wireless communications device saves energy by skipping some beams of the second set, thus reducing the number of beams trained in a beam sweep.

Furthermore, the wireless communications device may be able to turn off a whole antenna panel if none of the beams in that panel are deemed useful.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which:

FIG. 5 is a flow chart describing methods performed by a wireless communications device according to embodiments herein, FIG. 6 schematically illustrates two radio systems comprised in a wireless communications device and a method according to embodiments herein, FIG. 7 schematically illustrates two radio systems comprised in a wireless communications device and a method according to embodiments herein.

DETAILED DESCRIPTION

An object of embodiments herein is to reduce the beam training overhead for wireless communications devices.

Embodiments herein disclose a set of methods and mechanisms with which a wireless communications device, such as a UE, may receive a first set of beams, and based on e.g., an established functional relation, such as a learned function established by a supervised learning algorithm, of the first set of beams to a second set of beams, the wireless communications device may decide to only train over selected beams from the second set and not over all of the beams of the second set. The supervised learning algorithm may also be referred to as a method of machine learning.

The wireless communications device may furthermore decide to stop the beam training over the second set as soon as one or more beams with an acceptable measured performance are identified. The first and second set of beams may belong to different radio technologies, such as different radio access technologies (RAT), or they may be implemented on different frequency bands.

Additionally, the methods are used in order to enable the wireless communications device to perform the beam training over the second set of beams in a lower power consumption mode compared to the default high power consumption mode where the beam training is typically performed over all the beams of the second set.

Figure 1:
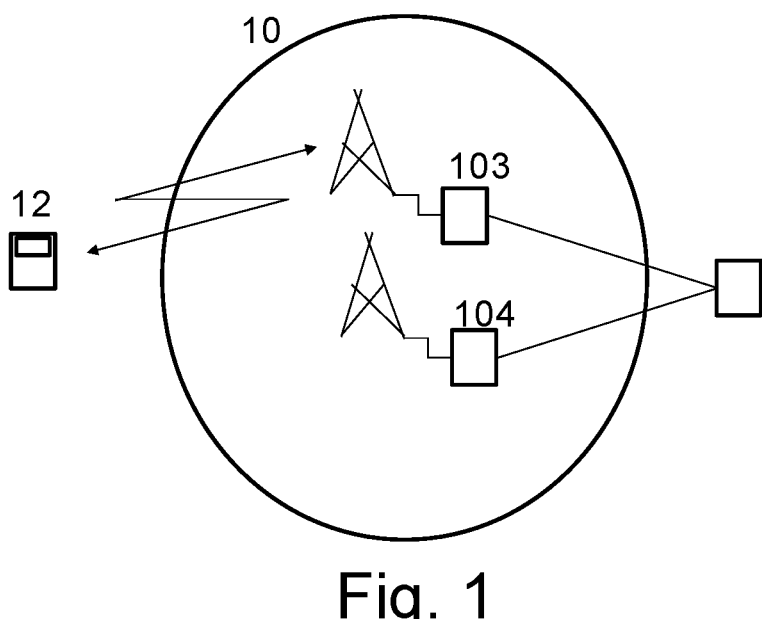
FIG. 1 illustrates a simplified wireless communication system.
Figure 2:
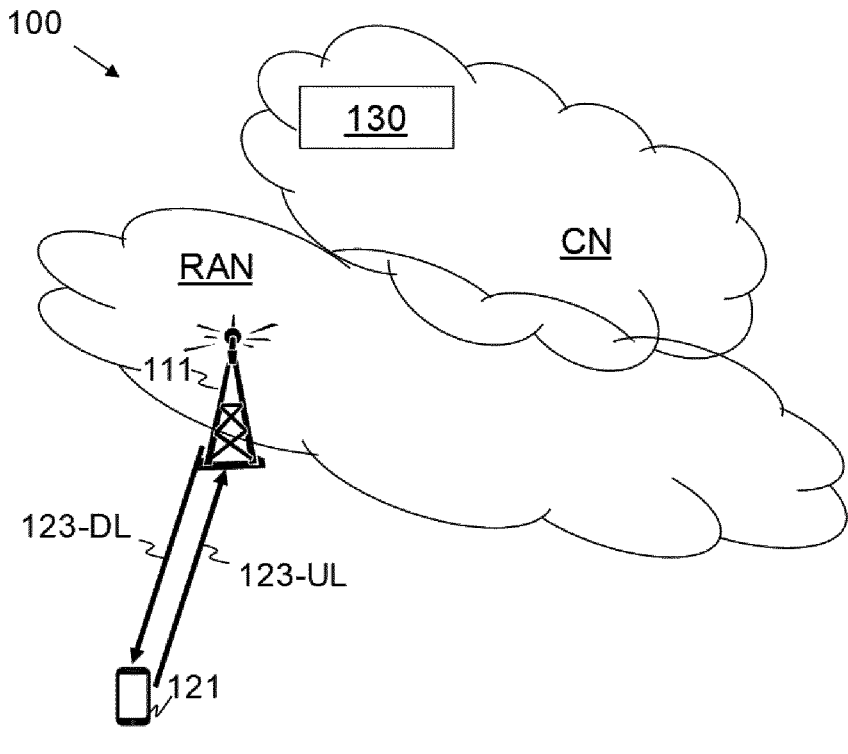
FIG. 2 is a schematic overview depicting a wireless communications network wherein embodiments herein may be implemented.

Embodiments herein relate to wireless communication networks in general. FIG. 2 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Access nodes, such as a radio access node 111, operate in the wireless communications network 100. The radio access node 111 provides radio coverage over a geographical area, a service area referred to as a cell 115, which may also be referred to as a beam or a beam group of a first radio access technology (RAT), such as 5G, LTE, Wi-Fi or similar. The radio access node 111 may provide further radio coverage over a further cell, beam or beam group (not shown in FIG. 2) of a further RAT.

The radio access node 111 may be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area depending e.g. on the radio access technology and terminology used. The radio access node 111 may comprise a Central Unit (CU) and a Distributed Unit (DU). The respective radio access node 111 may be referred to as a serving radio access node and communicates with a wireless communications device, such as a UE, with Downlink (DL) transmissions to the wireless communications device and Uplink (UL) transmissions from the wireless communications device.

A number of wireless communications devices operate in the wireless communication network 100, such as a wireless communications device 121, also referred to as a UE 121 herein.

The wireless communications device 121 may be a mobile station, a non-access point (non-AP) STA, a STA, a user equipment and/or a wireless terminal, that communicate via one or more Access Networks (AN), e.g. RAN, e.g. via the radio access node 111 to one or more CNs, e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node, e.g., smart phone, laptop, mobile phone, sensor, relay, mobile tablets or even a small base station communicating within a cell.

In order to receive and transmit radio signals the wireless communications device 121 may be equipped with electronic components for this purpose. Specifically, the wireless communications device 121 may comprise radio antennas and radio front-ends.

Figure 3:
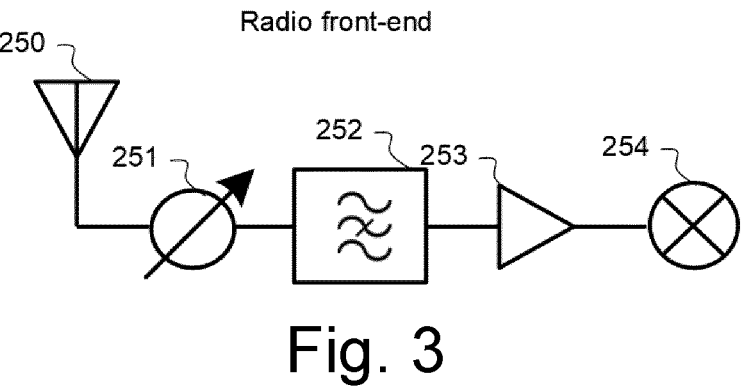
FIG. 3 is a block diagram schematically illustrating a radio antenna and front-end, FIG. 4*a* schematically illustrates two radio systems comprised in a wireless communications device according to embodiments herein, FIG. 4*b* schematically illustrates two sets of beams according to embodiments herein, FIG. 4*c* schematically illustrates two sets of beams according to embodiments herein.

FIG. 3 schematically illustrates a part of a radio equipment comprised in the wireless communications device 121 and related to reception of radio signals. The radio equipment is illustrated with electrical symbols. In FIG. 3 the radio equipment comprises an antenna 250 and a receiving radio front-end comprising a phase shifter 251, a bandpass filter 252, an RF amplifier 253 and a mixer 254. The radio equipment may also be referred to as an antenna circuitry or radio circuitry.

In order to communicate with different radio technologies and/or different frequency bands the wireless communications device 121 may be equipped with several radio circuitries or radio systems each adapted to one or more specific radio technologies and/or specific frequency bands.

Figure 4A:
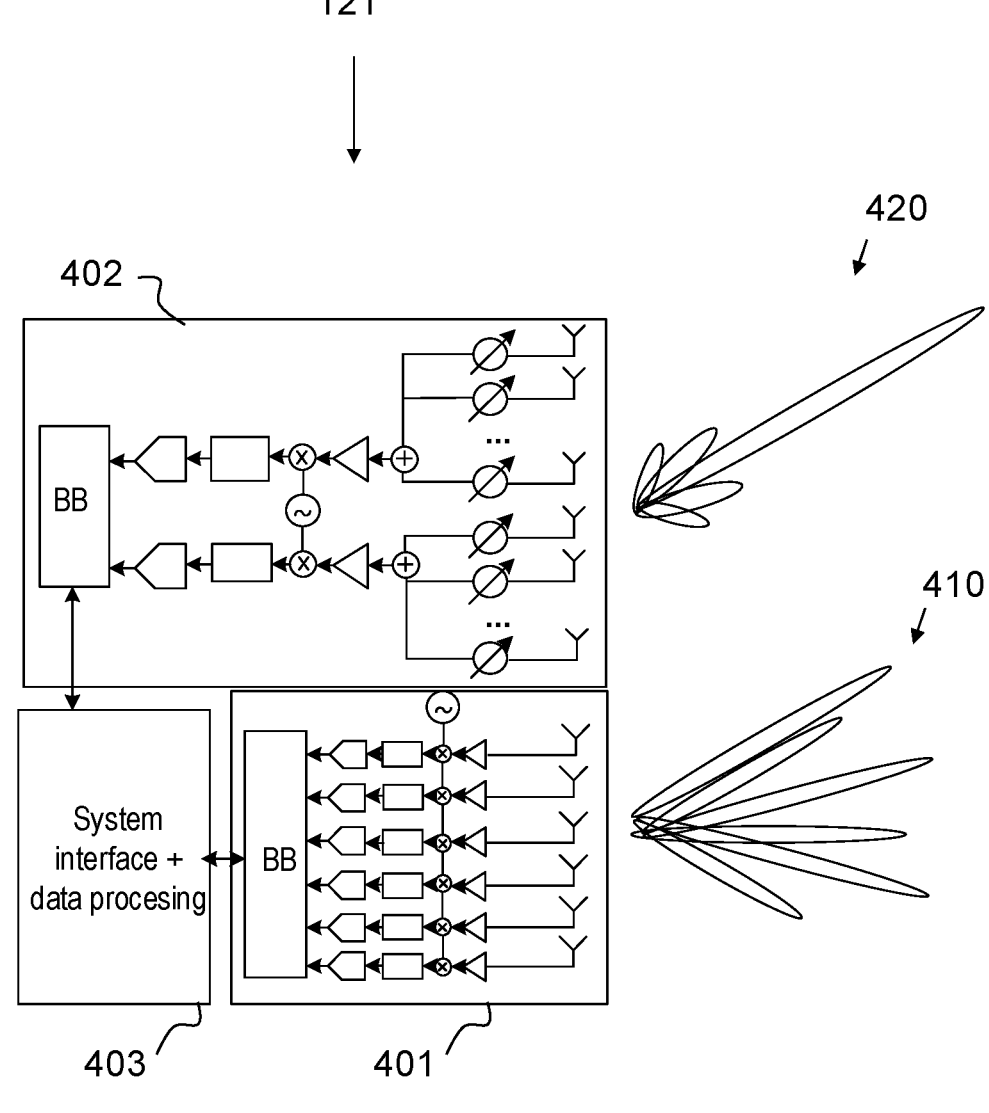

FIG. 4a schematically illustrates the wireless communications device 121 comprising two radio systems: a first system 401, also referred to as an auxiliary system 401 herein, and a second system 402, also referred to as a main system 402. The auxiliary system 401 may be a separate system that collects for example spatial information about the wireless communications device 121 and the environment, such as the channel and forwards this information to the main system 402 with the goal of making the beam search of the main system 402 more efficient. The spatial information about the wireless communications device 121 and the environment may be comprised in a so-called channel metric in embodiments herein. The channel metric may be a measurable characteristic of the wireless channel such as angular spectrum, mean angle, a spatial-temporal fingerprint, path loss, etc. The information from the second system 402 may be collected by one or more second beams 420 schematically illustrated in FIG. 4a. The first system

401 may also be configured with one or more first beams 410 schematically illustrated in FIG. 4a.

For example the main system 402 may be hybrid with 2 TX/RX chains configured to operate at high band, e.g., FR2.

The auxiliary system 401 may be fully digital, narrow-band, configured to operate at low band, e.g. FR1. Only Rx chains are illustrated for clarity.

Appropriate methods to reduce the beam training overhead for the wireless communications device 121 are provided below. Methods herein may be performed by the wireless communications device 121. Thus, embodiments herein are directed to methods, performed by the wireless communications device 121, for beam training with the radio access network 111 of the wireless communications system 100. As mentioned above, during beam training the wireless communications device 121 sweeps through its beams in order to find the best ones for further communication with the radio communications network 100. Beam sweeping is typically performed in the time domain, i.e., the wireless communications device 121 typically does not train two or more beams at the same time.

A scenario is considered where the wireless communications device 121 needs to perform beam training, e.g., Rx beam training, in one or more frequency bands belonging to a specific radio technology, e.g., NR, 6G, etc. Furthermore, the wireless communications device 121 may have the capability to support one or more further radio technologies, e.g., LTE, 3G, WiFi, etc. In a generic setup, it is assumed that the wireless communications device 121 is configured with at least a first set of beams and a second set of beams which may belong to different radio technologies, such as different RAT and/or different frequency bands. A beam configuration is typically, the number of the beams and direction or angle of transmission, or even transmit power particularly when the beam contains reference signal. A beam configuration is usually constant for quite a long time.

In one example, the first set of beams and the second set of beams belong to different radio technologies. E.g., the first set of beams belong to LTE and the second set belongs to NR, or the first set belongs to WiFi and the second set belongs to NR.

Figure 4B:
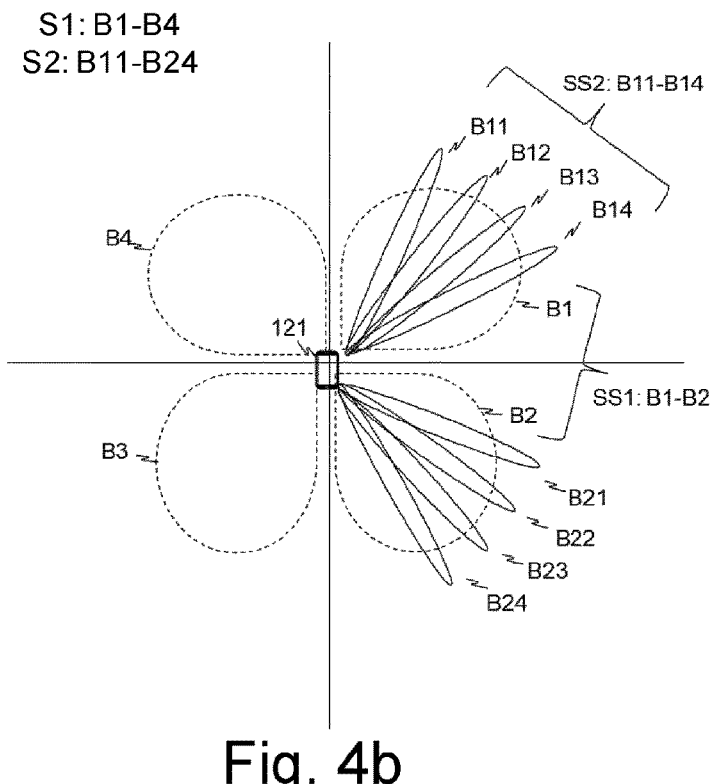

FIG. 4b illustrates the wireless communications device 121 and two sets of beams of the wireless communications device 121. In embodiments herein the wireless communications device 121 is configured with a first set S1 of multiple beams B1-B4 for a first beam training and a second set S2 of multiple beams B11-B24 for a second beam training. The second set S2 is different from the first set S1. However, the beams of the two sets may be at least partly overlapping. That is, the areas covered by the two sets of beams may be at least partly overlapping. In FIG. 4 the area covered by the second set S2 is partly overlapping with the area covered by the first set S1. However, on an individual beam level the beams of the first set S1 may have different shapes and directions compared to the shapes and directions of the beams of the second set S2.

In some embodiments the beams of the first set S1 and the beams of the second set S2 are receive beams. However, in some other embodiments the beams of the first set S1 are receive beams and the beams of the second set S2 are transmit beams or vice versa. It's also possible that both sets comprise transmit beams.

In some embodiments the first set S1 is associated with a first RAT and the second set S2 is associated with a second RAT which differs from the first RAT.

In some other embodiments the first set S1 is associated with a first frequency range, and the second set S2 is associated with a second frequency range which differs from the first frequency range.

In yet some further embodiments a combination of different RATs and different frequency ranges is possible.

In an example, the first set S1 of beams and the second set S2 of beams belong to a dual connectivity (DC) setup. For example, the wireless communications device 121 may be connected to LTE and NR at the same time, or both connections may be NR, or NR and 6G and so on.

In another example, the first set S1 of beams and the second set S2 of beams may belong to different frequency bands, e.g., the first set of beams may be in FR1 but the second set in FR2, or the first set may be centered at a carrier frequency of a 3 GHz band and the second set may be centered at a carrier frequency of a 6 GHz band, and so on.

In some embodiments herein the different frequency bands may be operated by the same radio technology (e.g. 5G NR). In another embodiment the different frequency bands are operated by different radio technologies.

In a further example, the first set S1 of beams and the second set S2 of beams may belong to different carriers either in the same frequency band or different frequency bands, e.g., in a Carrier Aggregation (CA) mode. Or the first set S1 and the second set S2 may belong to different RATs, e.g., one RAT may be configured with 4 beams and another RAT with 8 beams.

In some embodiments the first frequency range is lower than the second frequency range.

In one example, the wireless communications device 121 may want to perform beam training with the second set S2 as part of initial access, connection setup, serving/neighbor cell measurements, radio link measurements, beam failure detection/recovery, etc.

The method may comprise a learning phase and an exploitation phase. In the exploitation phase, the wireless communications device 121 may use information about the channel metric based on beam training on the first set S1 of beams in the exploitation phase to predict the best beams for beam training among the second set S2 of beams. In order to make the prediction in the exploitation phase, the wireless communications device 121 may establish a learned function, which also may be referred to as a prediction function, in the learning phase. The learned function may be established, or in other words trained, based on beam training on a first learning set LS1 of beams B1-B4 and further based on beam training on a second learning set LS2 of beams B11-B44 illustrated in FIG. 4c. The first learning set LS1 of beams may be the same set of beams as the first set S1 used in the exploitation phase and the second learning set LS2 of beams may be the same set of beams as the second set S2 used in the exploitation phase. An advantage of using the same set of beams for the training phase and the exploitation phase is that an accuracy of the predicted beams of the second set S2 may be guaranteed, that is, good performance may be guaranteed. Below, the learning phase and the exploitation phase will be explained in more detail.

In a generic example, in a first phase, such as the learning phase, the wireless communications device 121 performs beam training over the first learning set LS1 of beams and over the second learning set LS2 of beams. Then, e.g., using an outcome of the beam training, the wireless communications device 121 trains the learned function based on a channel metric measured based on the first learning set LS1 of beams to estimate quality of the beams in the second learning set LS2 of beams. The channel metric may e.g. be a spatio-temporal channel characteristics, also referred to as a spatio-temporal channel fingerprint herein.

In a second phase, such as the exploitation phase, when the learned function has been trained, the wireless communications device 121 receives the first set S1 of beams, and using the spatio-temporal channel fingerprint functionality of the learned function, estimates the quality of the second set S2 of beams, and determines based on the estimated quality one or more beams of the second set S2 to train. For example, the wireless communications device 121 may determine a quality of the beams of the second set S2 based on one or more beam quality metrics, e.g., Reference Signal Received Power (RSRP), Reference Signal Received Quality (RSRQ), Signal-to-Interference-plus-Noise Ratio (SINR), etc.

In some embodiments herein the learned function is established once. In other embodiments herein the learned function may be updated in further learning phases, also after the exploitation phase. For example, when the assumed coherence time is not valid anymore, there may be a need to redo the learning phase. In the case of further learning phases there may also be further exploitation phases.

As mentioned above, in some embodiments herein the channel metric mentioned above may be collected in a first RAT system and then it may be used in another RAT system. Some example properties of a main/auxiliary system pairing are:

Connection between wireless communications device 121 and network may already be established on the auxiliary system 402, when the wireless communications device 121 intends to perform beam training in the main system 402;

There may be an established interface and data processing unit 403 between the main and auxiliary systems 401, 402. The main system 402 and the auxiliary system 401 may communicate through the interface and data processing unit 403. The interface and data processing unit 403 may also be configured for data processing of data from the auxiliary system 401. The data may be base band data. For example, the interface and data processing unit 403 may estimate the main directions for beam training in the main system;

Auxiliary system 401 may be capable of operating in parallel to the main system 402.

Additionally, a desirable property of the auxiliary system 401 is having a fully digital antenna array as schematically illustrated in FIG. 4a which enables obtaining spatial data with a good angular resolution with simple baseband processing.

Some examples of main system/auxiliary system inter-RAT pairs are:

Main system: 5G/5G+ at 28/39/60 GHz, auxiliary system: LTE at sub-6 GHz,

Main system: 5G+ at 60 GHz, auxiliary system: TDD massive MIMO 5G at 28 GHz,

Main system: 802.11ad/ay, auxiliary system: 802.11n/ac/ax (non-standalone).

Main system: 6G at 100+ GHz, auxiliary system: 5G/5G+ at 28/39/60 GHz

Embodiments for beam training will now be described with reference to FIG. 5, which is a flow chart, and with further reference to FIGS. 2, 3 and 4b. The method for beam training is a method for beam training with the second set S2.

Actions 500a to 500c (Learning Phase)

Figure 4C:
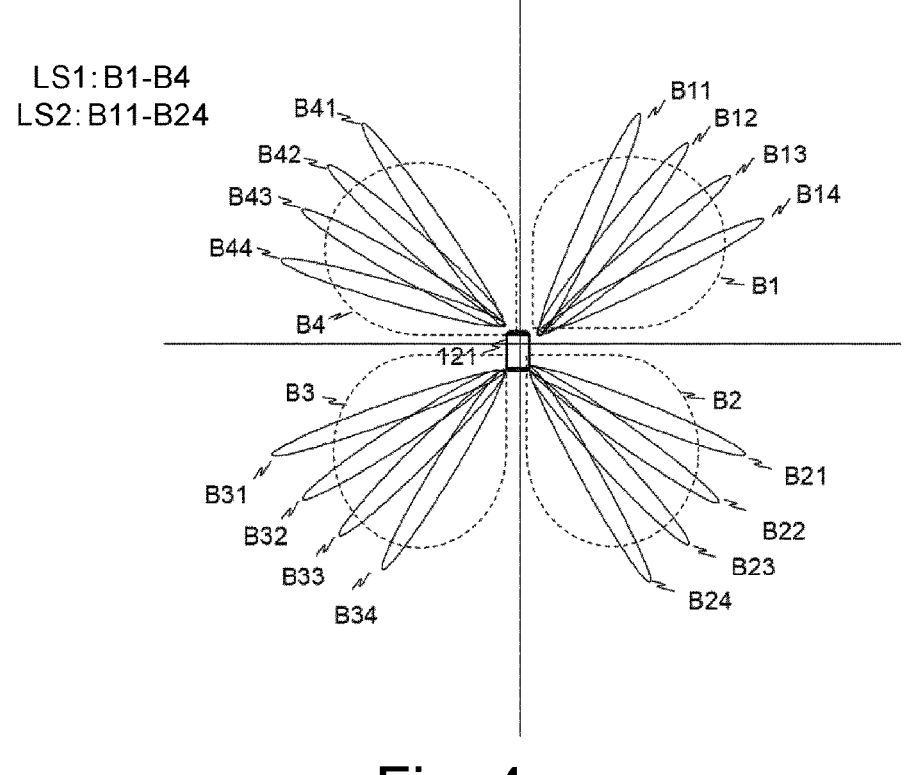

In some embodiments the wireless communications device 121 establishes a relation between the first set S1 of beams and the second set S2 of beams in a learning phase (e.g., as in the learning phase described in conjunction with FIG. 4b and FIG. 4c). In the learning phase the wireless communications device 121 may be connected to both the main system 402 and the auxiliary systems 401. The learning phase may comprise the following actions.

Action 500a

The wireless communications device 121 may perform multiple first beam trainings with the first learning set LS1 of multiple beams.

The wireless communications device 121 may calculate a channel metric associated with the wireless communications device 121 based on the performed first beam trainings with the first learning set LS1. As mentioned above, it may be advantageous to use the first set S1 of multiple beams B1-B4 used in the exploitation phase as the first learning set LS1.

The channel metric may comprise a spatio-temporal channel fingerprint. The spatio-temporal channel fingerprint may comprise one or more spatial and/or temporal characteristics of a wireless propagation channel 123-DL used for the first beam training with the first set S1. As mentioned above, the one or more spatial and/or temporal characteristics of the wireless propagation channel 123-DL may comprise: RSRP, RSRQ, SINR and similar metrics.

The spatio-temporal channel fingerprint may comprise angular- or angle-delay fingerprints pertaining to individual wireless communications devices, such as the wireless communications device 121. In contrast to statistical information, which is calculated over users and time, the spatio-temporal channel fingerprint used in embodiments herein are associated with a particular wireless communications device at a particular position, in a particular point in time. Some examples of fingerprints are:

Impulse response or its (squared) magnitude (for SISO),

Single- or double-directional impulse response or its (squared) magnitude (for SIMO/MIMO), given in general form as $$h(t, \tau, \Omega, \Psi) = \sum_{l=1}^{N(t)} h_l(t, \tau, \Omega, \Psi), \tag{2}$$

where t is time, $\tau$ delay, and $\Omega$ and, $\psi$ angles of departure and arrival, respectively, and N(t) the number of multipath components, Any of the pseudo-spectrum functions derived from a covariance matrix of signal in the UL. More specifically, for a system with M antennas with access to individual antenna elements in the baseband (e.g., a fully-digital antenna array), let the narrowband received signal across the array at observation index k, k E {1, . . . K} be represented by an M×1 vector $x_k$. (Observations may be e.g. in time or per subcarrier). The sample covariance matrix $C_x$ may then be calculated as $$C_x = \frac{1}{MK} XX^H, \tag{3}$$

where X=[$x_1$ $x_2$ . . . $x_k$]. Given a steering vector $$a(\omega) = \begin{bmatrix} 1 & e^{j\omega} & e^{j2\omega} & \dots & e^{j(M-1)\omega} \end{bmatrix}, \tag{4}$$

several pseudo-spectra (also denoted in literature as beamformers) which are functions of steering angle $\omega$ may be calculated, such as the conventional beamformer:

$$P(\omega) = a^H(\omega) C_x a(\omega), \qquad (5)$$

Capon beamformer:

$$P(\omega) = \frac{1}{a^H(\omega) C_x^{-1} a(\omega)}, \qquad (6)$$

or MUSIC beamformer:

$$P(\omega) = \frac{1}{a^H(\omega) U_N U_N^H a(\omega)}, \qquad (6)$$

where $U_N$ are the eigenvectors spanning the noise subspace of signal x.

Peaks of $P(\omega)$ may correspond to strongest directions $\omega$. It should be noted that signals from several wireless communications devices may be contained in $P(\omega)$.

An example of a spatio-temporal channel fingerprint is a magnitude of single-directional impulse response. The spatio-temporal channel fingerprint may be generated for sub-6 GHz frequencies using a cluster-based channel model.

Action 500b The wireless communications device 121 may perform multiple second beam trainings with the second learning set LS2. Each beam training with the second learning set LS2 corresponding to a respective beam training with the first learning set LS1. As mentioned above, it may be advantageous to use the second set S2 of multiple beams B11-B14 used in the exploitation phase as the second learning set LS2.

In order to be corresponding, the corresponding beam trainings may be performed within a large-scale coherence time. Thus, a time period between the corresponding first and second beam trainings in the learning phase may be less than the large-scale coherence time.

The large-scale coherence time may be described as a time over which large scale properties of the channel remain relatively the same. The large-scale coherence time may be an average time for a dominant angle-of-arrival and/or a dominant angle-of-departure to change by a certain degree, or a time after which path loss changes significantly.

Mapping from the first learning set LS1 to the second learning set LS2 may capture large-scale correlations, e.g., path gains, between the two beam sets. Thus, the time between the corresponding beam trainings may be equal or smaller to the smallest of large-scale coherence times of the channel associated with the first learning set LS1 and the channel associated with second learning set LS2. Preferably, the wireless communications device 121 has not moved much between the corresponding trainings.

Action 500c

In some embodiments the wireless communications device 121 then computes a learned function based on a supervised learning algorithm. Supervised learning may be described as the machine learning task of learning a function that maps an input to an output based on example input-output pairs. It may infer a function from labelled training data comprising of a set of training examples. In supervised learning, each example may be a pair comprising an input object (typically a vector) and a desired output value (also called the supervisory signal). A supervised learning algorithm analyses the training data and produces an inferred function, which may be used for mapping new examples. An optimal scenario may allow for the algorithm to correctly determine for example class labels for unseen instances.

Thus in embodiments herein, the learned function relates the channel metric to at least a subset SS2 of beams B11-B14 of the second set S2, based on a training data set comprising multiple instances of: a) a channel metric associated with the wireless communications device 121 and based on the respective first beam training with the first learning set S1 in the learning phase and b) a corresponding indication of beam quality of a respective beam out of one or more beams of the second learning set S2 based on the respective second beam training in the learning phase with the second learning set S2.

When the assumed coherence time is not valid anymore, there may be a need to redo the learning phase. The learning phase will be described in more detail below in connection with an example embodiment.

The indication of beam quality may for example be a) an indication of one or more best beam(s), and/or b) a beam quality metric such as RSRP or similar.

The learned function may relate the channel metric also to further beams of the second set S2. The learned function may relate a specific channel metric to a specific subset SS2 of beams of the second set S2. By performing beam training many times with different training conditions the learned function will be able to relate different channel metrics to different subsets SS2 of the second set S2.

The exploitation phase may comprise the following actions. In particular:

performing the first beam training with the first set S1 of multiple beams B1-B4;

calculating the channel metric based on the performed first beam training with the first set S1 of multiple beams B1-B4;

selecting the subset SS2 based on the calculated channel metric; and performing the second beam training with the selected subset SS2.

In some embodiments herein the wireless communications device 121 is not connected to the second RAT in the exploitation phase.

The following will explain the exploitation phase in more detail.

Action 501

The wireless communications device 121 performs the first beam training with the first set S1 of multiple beams B1-B4.

Action 502

The wireless communications device 121 calculates a channel metric associated with the wireless communications device 121 based on the performed first beam training with the first set S1. The channel metric may also be referred to as a system metric.

The channel metric may comprise a spatio-temporal channel fingerprint. The spatio-temporal channel fingerprint comprises one or more spatial and/or temporal characteristics of a wireless propagation channel used for the first beam training with the first set S1. The wireless propagation channel may be a wireless DL propagation channel 123-DL or a wireless UL propagation channel 123-UL.

In some embodiments calculating the channel metric is based on baseband processing of one or more reference signals received with the first set S1 during the first beam training with the first set S1.

Action 503

The wireless communications device 121 selects, for the second beam training, a subset SS2 of beams B11-B14 of the second set S2 based on the calculated channel metric. The calculated channel metric may for example be RSRP, RSRQ, SINR, etc.

The subset SS2 may be a proper subset of the second set S2. That is, when the subset SS2 is a proper subset of the second set S2 the subset SS2 does not comprise all the beams of the second set S2.

Selecting the subset SS2 may be performed in response to a constraint on power consumption of the wireless communications device 121 or a constraint on dedicated radio access resources used for beam training. Thus, by selecting the subset SS2 of beams B11-B14 of the second set S2 of multiple beams B11-B24, the wireless communications device 121 is able to save power and/or dedicated radio access resources.

In some embodiments herein, selecting the subset SS2 of beams B11-B14 of the second set S2 of multiple beams B11-B24 is further based on the learned function relating the channel metric to the subset SS2 of beams B11-B14 of the second set S2. If selecting the subset SS2 of beams B11-B14 of the second set S2 of multiple beams B11-B24 is further based on the learned function, the method further comprises the learning phase described above in action 500. Further learning phases may be performed also after action 503 in order to continue refining the learned function, e.g., since the environment changes with time.

The learned function may relate the channel metric to an estimated measure of a beam quality of the respective beam of the subset SS2 of beams B11-B14. Then, selecting the subset SS2 of beams B11-B14 may further be based on the estimated measure of the beam quality.

Selecting the subset SS2 of beams B11-B14 out of the second set S2 may further be based on a cardinality of a high-quality subset SS1 of beams of the first set S1, wherein the high-quality subset SS1 comprises beams meeting a high-quality beam quality criterion. As mentioned above, beam quality may be evaluated based on metrics such as RSRP, RSRQ, SINR and similar metrics. Thus, the high-quality subset SS1 of beams of the first set S1, may comprise beams for which the RSRP and/or SINR is higher than a specific threshold RSRP and/or SINR.

For example, the cardinality of high-quality beams measured in the first set S1 may be used by the wireless communications device 121 to enhance the beam training in the second set S2. If the wireless communications device 121 knows that only 1 beam, out of 16 beams, in the first set S1 of beams is estimated to meet a performance threshold, the wireless communications device 121 may consider the propagation channel as sparse and use this information to adapt the Rx codebook. For example, instead of training the second set of beams in their original 16-beam codebook, the wireless communications device 121 may use an alternative 3-beams codebook, where each of such 3 beams consists of distinct combinations of the original 16 beams. The combinations may be linear. With appropriate post-processing, this means that the wireless communications device 121 may estimate the best of the 16 beams from 3 received signals, and thus save power.

In other words, if the wireless communications device 121 measures that only one of the 16 original beams provides relatively high Rx power over time, it may consider the channel to be sparse in the beam domain. With that said, the wireless communications device 121 may use a new codebook, e.g., made out of only two beams, to detect the best original beam. Each of the two beams of the new codebook, may be a combination of all beams of the original codebook. For example, the first beam may be a linear combination with all beams of the original codebook where the combining weights are all ones, and the second beam may be a linear combination with all beams of the original codebook with weights $\exp(j*pi*(n-1)/N)$, where $1<n<N$, and n denotes the beam index. The wireless communications device 121 may analyze the difference in phase shift between the 2 measurements, each measurement associated with each entry of the new codebook, to infer the best original beam. For example, if there is no phase difference between the 2 measurements, it may mean that it is the beam with index n=1 that is dominating over the other beams since it was assigned the weight 1 in the first novel beam and the weight $\exp(j*pi*(1-1)/N)=1$ in the second novel beam, thus no phase shift across novel beams exist. The novel codebook in the previous example had 2 beams, which is the minimum number of beam measurements to detect the best beam in a sparse channel where one of the original beams dominates over others. But the novel codebook may have 3 beams (as further above) or 4 beams or more as well.

The model for the signals received in the new codebook beams may be as follows:

$$z=BFy=Wy$$

The entries of a column vector y comprise a received signal at each antenna element, and F is a 16-by-16 Fourier matrix comprising the original beam weights applied at each antenna element. The $2\times16$ matrix W=BF represents the new codebook with 2 beams, were the $2\times16$ matrix B comprises the combining weights (i.e. in the example above, the first two rows has ones in the entries, and the second two rows has distinct unit-magnitude phasors.). To detect the best original beam, the wireless communications device 121 may do one more further processing step:

$$x=W^{H}z$$

The index of the entry of x with largest magnitude may be used as the index of the original beam that will be used. $W^{H}$ is the conjugate transpose of W.

By combining the original beams it is possible to scan several directions at once and the risk for beam failure is reduced since there is an increased chance of finding the best beam direction. Due to the coherent post processing the channel should remain phase invariant during the two measurements.

Thus, in some embodiments the second set S2 of multiple beams B11-B24 comprises combinations of beams comprised in a codebook. Then selecting the subset SS2 of beams B11-B14 out of the second set S2 of multiple beams B11-B24 comprises selecting a subset of the combinations of beams comprised in the codebook.

Selecting the subset of the combinations of beams comprised in the codebook may be performed if the cardinality of the high-quality subset SS1 is below a threshold cardinality.

Action 504

In some embodiments the wireless communications device 121 determines to not buffer second reference signals received on beams of the second set S2 which were not selected for beam training. For example, the wireless communications device 121 may skip buffering the reference signals over the beams that it does not choose for training. The reference signals may be e.g., SSB, TRS/CSI-RS, CRS, etc. As such, the wireless communications device 121 may be able to turn off some of the RF functionalities or even more functionalities, depending on the duration of skip.

By not buffering the second reference signals received on the beams of the second set S2 which were not selected for beam training the wireless communications device 121 is able to save power and/or dedicated radio access resources.

Action 505

The wireless communications device 121 performs the second beam training with the selected subset SS2. That is, beam training may be omitted on the beams of the second set S2 which were not selected for beam training with the second set S2. At least one beam of the second set S2 may be omitted for beam training.

The second beam training with the subset SS2 may comprise measuring beam quality of the respective beam B11-B14 of the selected subset SS2.

In one example, the wireless communications device 121 may decide to determine one or more of the best quality beams of the second set S2 based on the outcome of the exploitation phase, and only perform beam training, e.g., by performing signal quality measurements (e.g. RSRP), on those beams. If the signal quality on the measured beams is satisfactory (e.g., RSRP is above a specific threshold), then it stops measurements on the remaining beams from the second set of beams. E.g., the second set of beams may comprise 64 beams, and the wireless communications device 121 chooses to check the quality of the best 8 beams based on the outcome of the method described above, and thereby the wireless communications device 121 may skip training over the other 56 beams and achieve energy saving. E.g., the wireless communications device 121 may be configured with the first set S1 of beams in the sub 6 GHz band, e.g., 8 beams, and the second set S2 of beams in the 24 GHz band, e.g., 64 beams, where the 64 beams in the 24 GHz bands are narrow and fit within the 8 beams in sub-6 GHz band. In a simple example, beams 1 to 8 from 24 GHz band fit within beam 1 from the sub 6 GHz band, beams 9 to 16 within beam 2, and so on. In one example, the wireless communications device 121 receives the 8 beams of the first set of beams and determines that the quality in beam 1 and beam 3 are not good, e.g., SINR below 0 dB, and thus considering that the channel attenuations in a higher frequency band, i.e., 24 GHz is even higher, it decides, based on the channel metric calculated in action 502 above, to skip training in beams 1 to 8 and beams 17 to 24 from the second set of beams. As mentioned above, the channel metric is based on the performed first beam training with the first set S1.

Action 506

As mentioned above, the wireless communications device 121 may further reduce the beam search (i.e., beam training) effort by stopping the beam search once a performance parameter, e.g. RSRP, SINR, etc. is above a threshold for a beam from the reduced set SS2 of beams. For example, the second set S2 of beams may consist of 64 beams, and the wireless communications device 121 chooses to train the subset SS2 comprising four beams B11-B14 from the second set S2. That is, the wireless communications device 121 chooses to check the quality of the four beams B11-B14 of the subset SS2. The four beams B11-B14 of the subset SS2 are estimated to be the best beams of the second set S2 based on the beam training with the first set S1 of beams. The wireless communications device 121 then proceeds to measure signal quality on the estimated best 4 beams B11-B14 of the second set S2 and compares the measured signal quality with a signal quality threshold. For example, the quality measure may be RSRP and the threshold may be −100 dBm. For the first measured beam B11 from the four selected second beams B11-B14, RSRP may be e.g. −105 dBm. For the second measured beam B12, RSRP may be −97 dBm, which is above the threshold. The wireless communications device 121 then decides to abort further measurements. In this example, only 2 out of 64 beams from the second set S2 have been measured.

Thus, in general the wireless communications device 121 may terminate measuring beam quality of the respective beam B11-B14 of the selected subset SS2 in response to a measured beam quality fulfilling a beam quality criterion. In other words, the wireless communications device 121 may terminate the second beam training in response to the measured beam quality fulfilling the beam quality criterion.

In another example, the wireless communications device 121 may train the second set S2 of beams in descending order with respect to their estimated quality. In the same manner as described just above, the wireless communications device 121 does not need to necessarily scan a whole subset of the second set of beams when performing the second beam training in descending order of estimated beam quality. For example, the second set S2 of beams may consist of 16 beams, and each of these 16 beams may have an associated estimated quality which was estimated using, e.g. RSRP measurements with the first set S1 of beams and the trained function mapping between the first set S2 and the second set S2. Here, the wireless communications device 121 may start scanning progressively from the beam associated with higher quality to the beam associated with lower quality. The second beam training may stop as soon as a quality metric associated with one scanned beam meets a satisfactory threshold condition.

Action 507

In some embodiments, in response to the measured beam quality meeting the beam quality criterion, the wireless communications device 121 reduces a supplied power to at least a part of an antenna circuitry 251, 252, 253, 254 associated with beam training on beams of the second set S2 which were not selected for the second beam training.

Thus, the wireless communications device 121 may turn off circuitry, such as antenna front-ends, or parts of the circuitry, associated with scanning of the beams from the second set of beams once the best beam has been found. Alternatively, said circuitry is not completely turned off but put in a low power consumption state. Together with approaches described above, this realization results in energy savings in the wireless communications device 121.

In some embodiments the wireless communications device 121 may be able to turn off a whole antenna panel (e.g., as in the case of FR2 in NR) if none of the beams in the panel is good for connectivity, or there is a sufficient number of good quality beams in the other panel which comprises beams which have been selected. E.g., in a 64 beam setup for the second set S2, beams 1 to 32 may belong to a first panel, and beams 33 to 64 may belong to a second panel. Furthermore, if it turns out that none of the beams 1 to 32 are most likely good ones to perform beam training with, the wireless communications device 121 may decide to turn off the whole first panel and focus the beam training to the second panel.

The wireless communications device 121 may change the beamforming structure to obtain the same selected beams with the same quality, or close enough, with a power saving beamforming mode e.g., turning off some antennas and/or phase shifters, and/or digital Rx chains and/or some other antenna electronics).

In some embodiments, particularly when channel reciprocity holds, the wireless communications device 121 may apply the same beams and thereby same modified hardware configuration examples as above to both DL and UL.

In another example, the wireless communications device 121 employs the measurements obtained on the first set S1 of beams in order to improve the robustness of the second set S2 of beams. E.g., the wireless communications device 121 may operate in a relaxed measurement mode (e.g., indicating low speed of the wireless communications device 121) in the second set S2 of beams due to good coverage. The wireless communications device 121 may then measure the first set S1 of beams and based on a change on the first set S1, e.g., coverage loss in some beams, and employing the channel metric, predict a coverage loss in the second set S2 of beams, and thereby trigger a more aggressive beam measurements over the second set S2 of beams to avoid coverage loss in the second set S2 of beams.

The coverage loss may be avoided by measuring more beams in the second set S2 to improve the robustness.

In embodiments herein, a default assumption may be that the wireless communications device 121 trains in all the configured second set of beams as default, and thus there is a default high power mode for beam training. Then based on the examples above, the wireless communications device 121 may skip one or more beams or panels, and thus operate in a low power mode. Therefore, in terms of power management, the wireless communications device 121 receives a first set of beam, and based on the examples above, decides to train in selected beams from the second set S2 of beams, and thus in a low power training mode achieves power saving.

Example Embodiments Related to Training and Exploitation Phases

The below examples describe how a functionality between the first and the second set of beams may be established.

A scenario where the wireless communications device 121 is configured with a slot-based transmission will be considered.

The main system 402 is exemplified with NR, while the auxiliary system 401 is exemplified with LTE.

Furthermore, the wireless communications device 121 may access both LTE and NR systems. Both systems are time-synched on slot basis. Then, the example states are as follows:

State 1 (slots 100-200): LTE beams are received and used for learning to estimate the best NR beams, e.g., as in the case of E-UTRAN New Radio—Dual Connectivity (EN-DC), the wireless communications device 121 may receive both LTE and NR beams (LEARNING)

State 2 (slots 200-300): LTE beams used to estimate best NR beams (EXPLOITING)

State 1 (slots 300-400): LEARNING

State 2 (slots 400-500): EXPLOITING, etc.

Furthermore, we may describe in more detail how the functionality between the two systems, e.g., LTE and NR in this example may be established. Additionally, it is assumed that the auxiliary system 402, e.g., LTE, operates in a lower frequency compared to the main system 402, such as NR.

Figure 6:
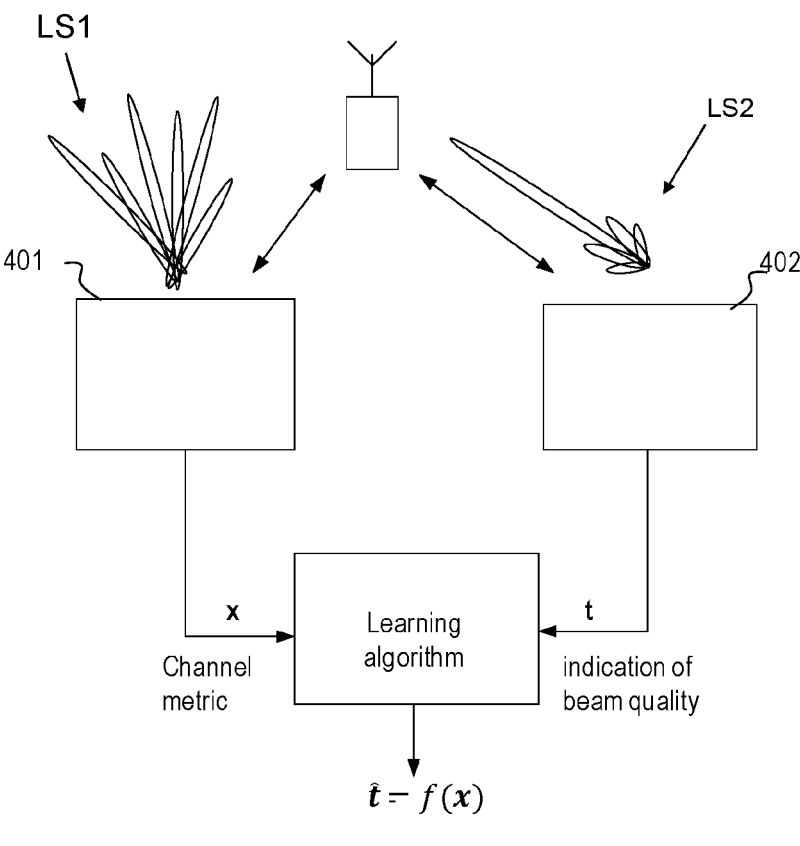
Figure 7:
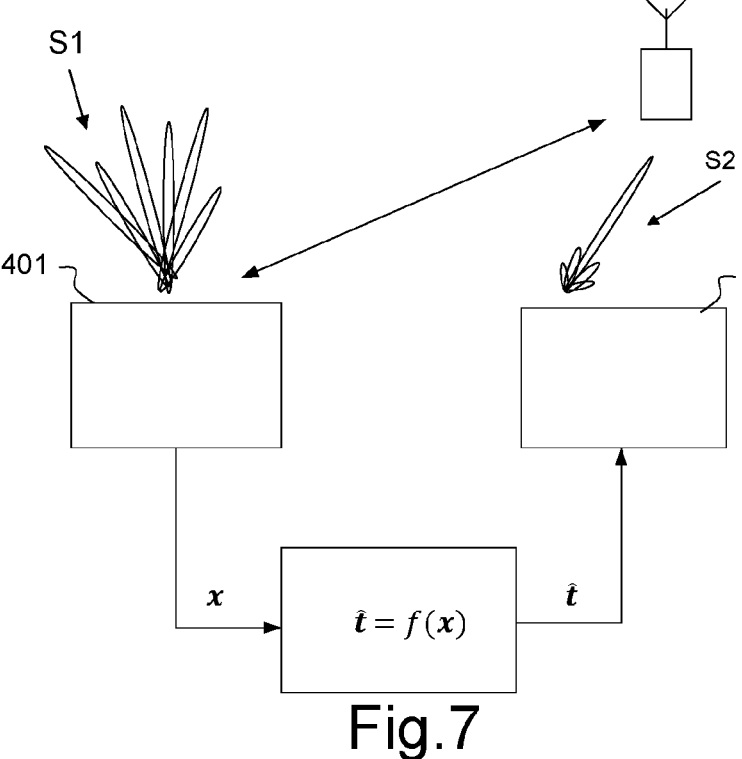

As mentioned above, embodiments herein may comprise of a learning phase, illustrated in FIG. 6, and exploitation phase, illustrated in FIG. 7.

In the learning phase illustrated by FIG. 6 and described above in relation to actions 500a to 500c, the wireless communications device 121 is connected to both the main system 402 and the auxiliary system 401. The main system 402 may be NR and the auxiliary system 401 is LTE.

The channel metric, such as the spatio-temporal fingerprint, associated with the wireless communications device 121 is measured by the auxiliary system 402 based on the first learning set LS1 and represented by the vector of features x. This part is related to action 500a above.

As mentioned above in relation to action 500b, the main system 402 performs beam training with second learning set LS2 in the learning phase. Based on the beam training with second learning set LS2 in the learning phase the main system 402 provides information about the best beam (binary coded) in the second learning set LS2 used to serve the wireless communications device 121, and/or about a beam quality metric (real-valued), such as signal strength, in all or a selection of beams of the second learning set LS2 targeting the wireless communications device 121. The selection of beams from the second learning set LS2 in the learning phase may be based on the channel metric. This information, i.e., the selection of beams from the second learning set LS2, is represented by the target vector t.

As described above in relation to Action 500a, the training data set, comprising features x and target t, is used by a learning algorithm to compute the learned function, e.g., to infer the mapping $\hat{t}=f(x)$, where t is the estimate of the best beam from the second learning set LS2 and/or best beam power vector from the second learning set LS2. In other words, the wireless communications device 121 learns how the channel metric of the wireless communications device 121 at a lower frequency band relates to the choice of the best beam to serve the same wireless communications device 121 on the higher frequency band. When the target vector encodes the best beam, the problem being solved is a classification problem; when the target vector contains beam powers or other real values, inferring $\hat{t}=f(x)$ is a regression problem. Note that information from many dual-connectivity connections and wireless communications devices over a longer period of time may be used to train the learning algorithm.

In the exploitation phase illustrated by FIG. 7, it is assumed that the wireless communications device 121 is connected only to the auxiliary system 402 and expresses intention to connect to the main system 402, e.g., as part of initial access, connection setup, etc. The measured channel metric ff the first beam set S1 associated with the auxiliary system 401, is used as input to learn $\hat{t}=f(x)$, which outputs one or a few candidate directions for a focused beam search targeting the wireless communications device 121 on the main system 402.

Figure 8:
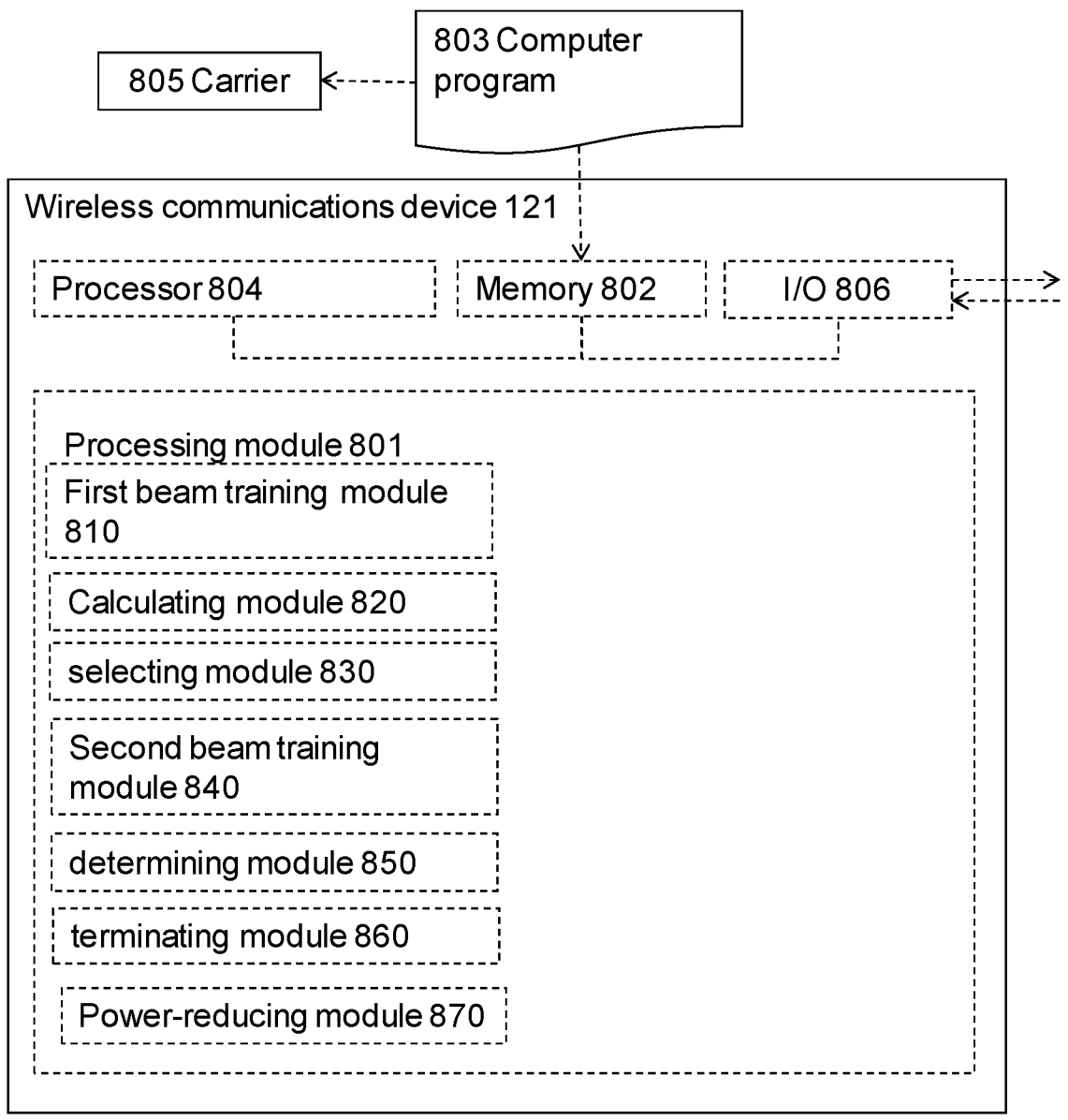
FIG. 8 is a block diagram schematically illustrating a wireless communications device according to embodiments herein, FIG. 9 schematically illustrates a telecommunication network connected via an intermediate network to a host computer.

FIG. 8 illustrates a schematic block diagram of embodiments of the wireless communications device 121. The wireless communications device 121 is configured for beam training with the radio access network 111 of the wireless communications system 100. The wireless communications device 121 is further configured with the first set S1 of multiple beams B1-B4 for the first beam training and the second set S2 of multiple beams B11-B24 for the second beam training. The second set S2 is different from the first set S1.

The wireless communications device 121 is configured to perform the method actions described above. For that purpose, the wireless communications device 121 may comprise a processing module 801 for performing the above method actions. The processing module 801 may comprise a first beam training module 810.

The processing module 801 may further comprise a calculating module 820, a selecting module 830, second beam training module 840, a determining module 850, a terminating module 860 and a power-reducing module 870.

The wireless communications device 121 is configured to, e.g. by means of the first beam training module 810, perform the first beam training with the first set S1 of multiple beams B1-B4.

The wireless communications device 121 is configured to, e.g. by means of the calculating module 820, calculate the channel metric associated with the wireless communications device 121 based on the performed beam training with the first set S1.

The wireless communications device 121 is configured to, e.g. by means of the selecting module 830, select, for the second beam training, the subset SS2 of beams B11-B14 of the second set S2 based on the calculated channel metric.

The wireless communications device 121 is configured to, e.g. by means of the second beam training module 840, perform the second beam training with the selected subset SS2.

In some embodiments, the wireless communications device 121 is configured to, e.g. by means of the selecting module 830, select the subset SS2 of beams B11-B14 of the second set S2 of multiple beams B11-B24 further based on the learned function relating the channel metric to the subset SS2 of beams B11-B14 of the second set S2.

Then the wireless communications device 121 is configured to, e.g. by means of the first beam training module 810, perform multiple first beam trainings with the first set S1.

Then the wireless communications device 121 is configured to, e.g. by means of the second beam training module 840, perform multiple second beam trainings with the second set S2. Each beam training with the second set S2 corresponding to the respective beam training with the first set S1.

Then the wireless communications device 121 is further configured to compute the learned function based on the supervised learning algorithm and based on the training data set comprising multiple instances of: a) the channel metric associated with the wireless communications device 121 and based on the respective first beam training with the first set S1 in the learning phase and b) the corresponding indication of beam quality of the respective beam out of one or more beams of the second set S2 based on the respective second beam training in the learning phase with the second set S2.

In some embodiments, the wireless communications device 121 is configured to, e.g. by means of the selecting module 830, select the subset SS2 of beams B11-B14 is further based on the estimated measure of the beam quality.

The wireless communications device 121 may be configured to, e.g. by means of the second beam training module 840, measure beam quality of the respective beam B11-B14 of the selected subset SS2 as part of the second beam training with the subset SS2.

The wireless communications device 121 may be configured to, e.g. by means of the terminating module 860, terminate measuring beam quality of the respective beam B11-B14 of the selected subset SS2 in response to the measured beam quality fulfilling the beam quality criterion.

In some embodiments, the wireless communications device 121 is configured to, e.g. by means of the calculating module 820, calculate the channel metric is based on baseband processing of the one or more reference signals received with the first set S1 during the first beam training with the first set S1.

The wireless communications device 121 may be configured to, e.g. by means of the selecting module 830, select the subset SS2 in response to the constraint on power consumption of the wireless communications device 121 or the constraint on dedicated radio access resources used for beam training.

In some embodiments, the wireless communications device 121 is configured to, e.g. by means of the determining module 850 determine to not buffer second reference signals received on beams of the second set S2 which were not selected for beam training.

The wireless communications device 121 may be configured to, e.g. by means of the power-reducing module 870, reduce the supplied power to at least the part of an antenna circuitry 251, 252, 253, 254 associated with beam training on beams of the second set S2 which were not selected for the second beam training in response to the measured beam quality meeting the beam quality criterion.

The wireless communications device 121 may be configured to, e.g. by means of the selecting module 830, select the subset SS2 of beams B11-B14 out of the second set S2 further based on the cardinality of the high-quality subset SS1 of beams of the first set S1, wherein the high-quality subset SS1 comprises beams meeting the high-quality second beam quality criterion.

The wireless communications device 121 may be configured to, e.g. by means of the selecting module 830, perform the above selection if the cardinality of the high-quality subset SS1 is below the threshold cardinality.

The wireless communications device 121 may be configured to not be connected to the second RAT in the exploitation phase.

The embodiments herein may be implemented through a processor 804 e.g. comprising one or more processors, in the electronic wireless communications device 121 depicted in FIG. 8, together with computer program code, e.g. computer program, for performing the functions and actions of the embodiments herein. The program code mentioned above may also be provided as a computer program product, for instance in the form of a data carrier carrying computer program code for performing the embodiments herein when being loaded into the wireless communications device 121. One such carrier may be in the form of a CD ROM disc. It is however feasible with other data carriers such as a memory stick. The computer program code may furthermore be provided as pure program code on a server and downloaded to the wireless communications device 121.

The wireless communications device 121 may further comprise a memory 802 comprising one or more memory units. The memory 802 comprises instructions executable by the processing circuit in the wireless communications device 121. The memory 802 is arranged to be used to store e.g. information, indications, data, configurations, and applications to perform the methods herein when being executed in the wireless communications device 121. The memory 802 may be a non-volatile memory e.g., comprising NAND gates, from which the wireless communications device 121 may load its program and relevant data. Updates of the software may be transferred via a wireless connection.

To perform the actions above, embodiments herein provide a computer program 803, comprising computer readable code units which when executed on the wireless communications device 121 causes the wireless communications device 121 to perform any of the method actions above.

In some embodiments, the computer program 803 comprises instructions, which when executed by a processor, such as the processing circuit 804 of the wireless communications device 121, cause the processor to perform any of the method actions above. In other words, the computer program 803 comprises computer readable code units which when executed on the wireless communications device 121 causes the wireless communications device 121 to perform any of the method actions above.

In some embodiments, a carrier 805 comprises the computer program 803 wherein the carrier 805 is one of an electronic signal, an optical signal, a radio signal and a computer readable medium.

The carrier 805 may also be one of an electromagnetic signal, a magnetic signal, an electric signal, a microwave signal.

To perform the method actions above, the wireless communications device 121 may comprise an Input and Output (I/O) unit 806. The I/O unit 806, 806 may further be part of one or more user interfaces.

Those skilled in the art will appreciate that the modules and/or units in the wireless communications device 121 described above may refer to a combination of analog and digital circuits, and/or one or more processors configured with software and/or firmware, e.g., stored in the wireless communications device 121, that when executed by, e.g., the processing circuit 801, above causes the wireless communications device 121 and/to perform the method actions above. The processing circuit 801, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "unit" may refer to one or more functional units, each of which may be implemented as one or more hardware units and/or one or more software units and/or a combined software/hardware unit. In some examples, the unit may represent a functional module realized as software and/or hardware.

As used herein, the term "carrier", which also may be referred to as a "computer program carrier" or "program carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a transmitting means, receiving means, monitoring means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing unit" or "processing circuit" may herein encompass a processing module, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

Figure 9:
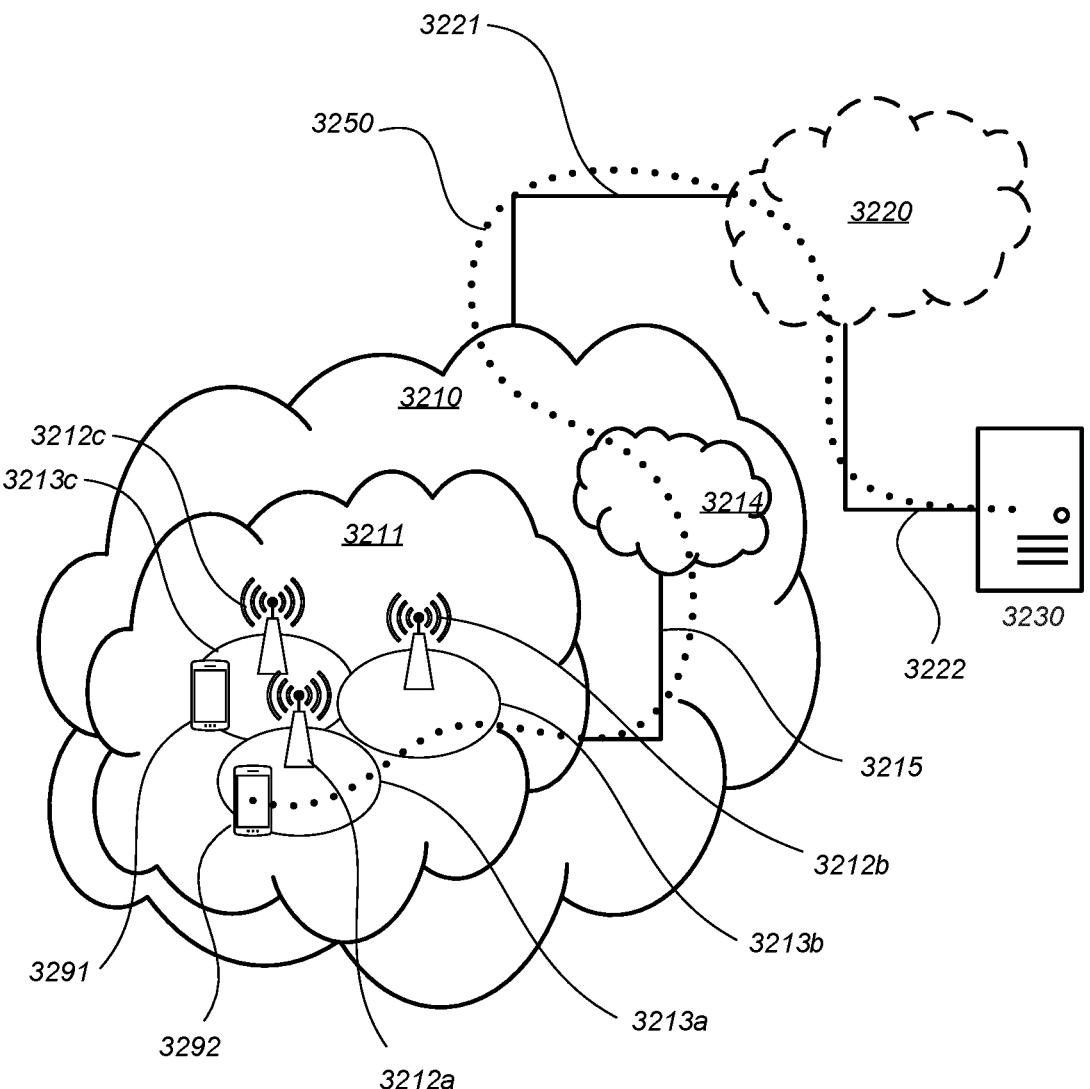

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target access node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 such as e.g. the UE 121, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

Figure 10:
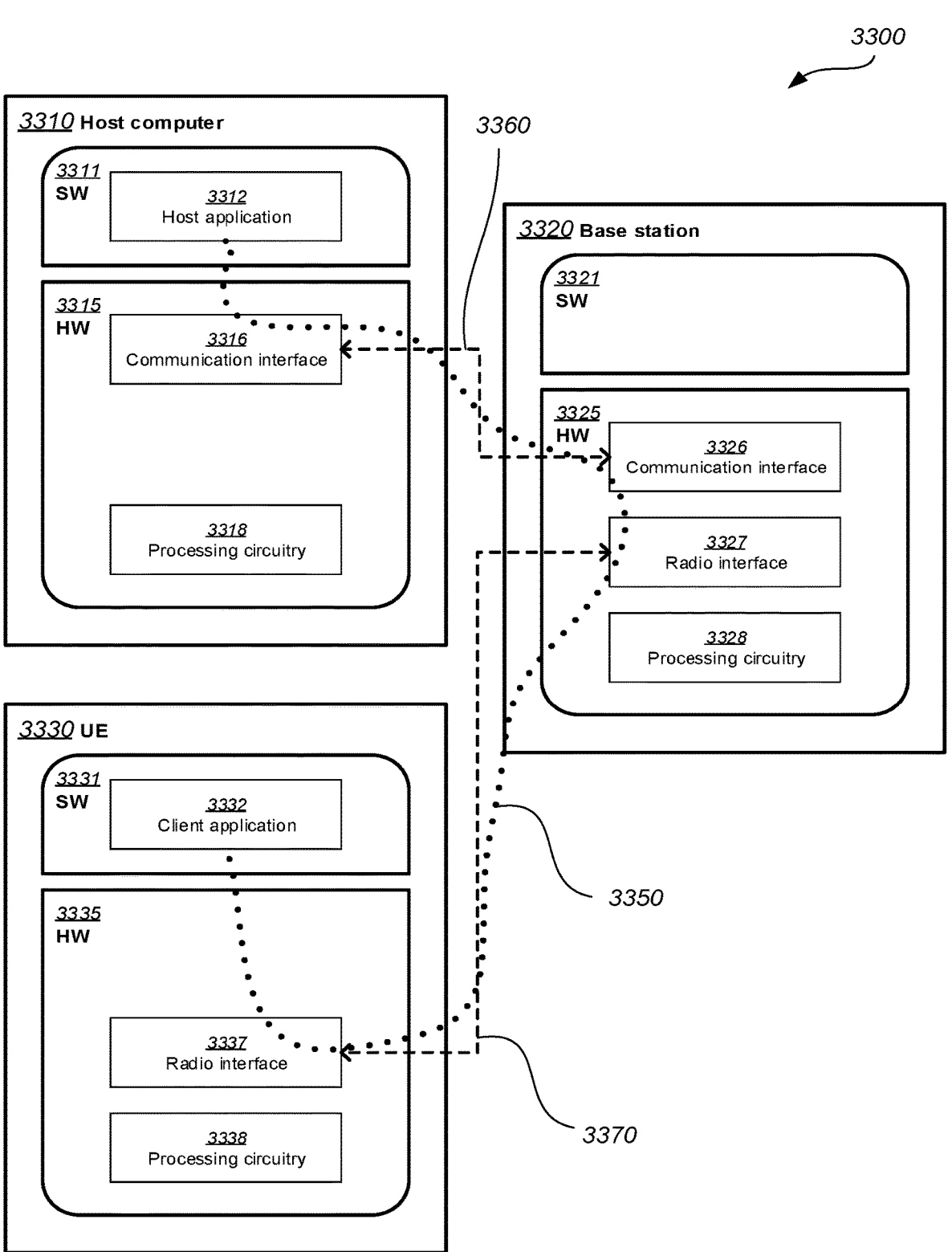
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
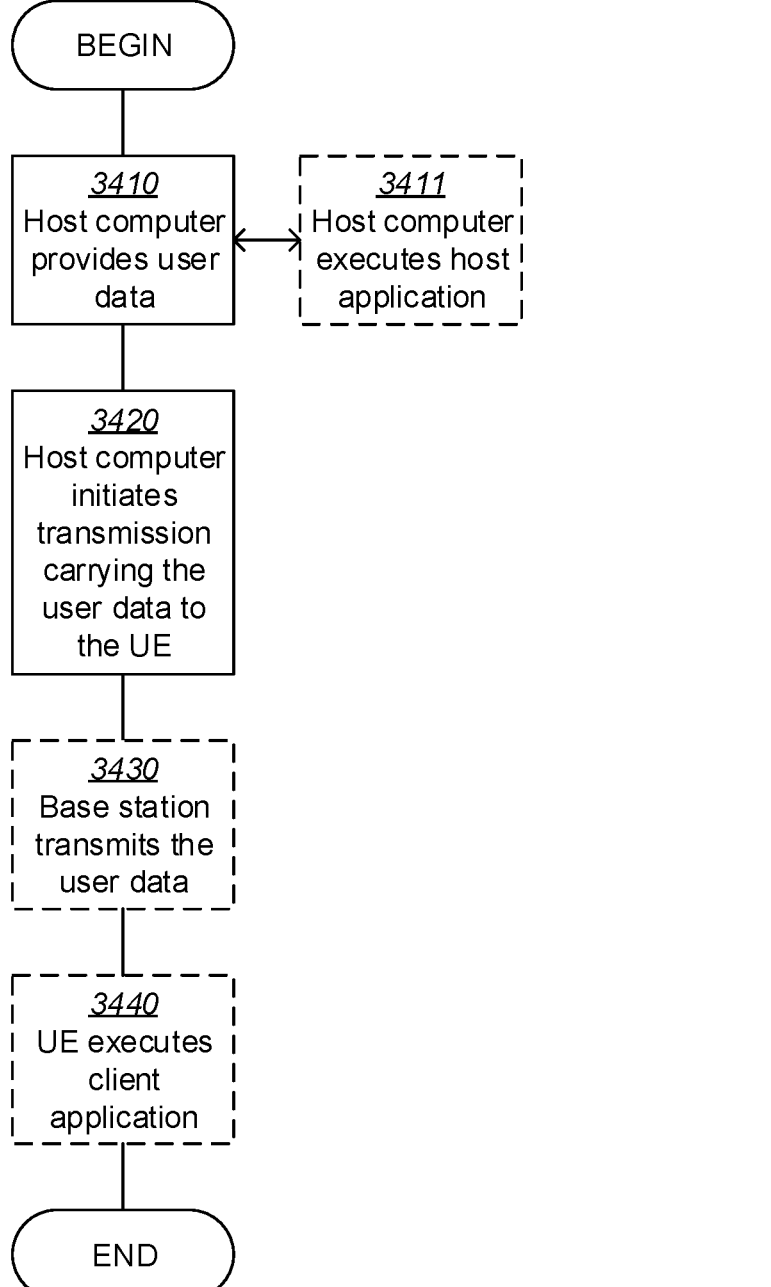
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 13:
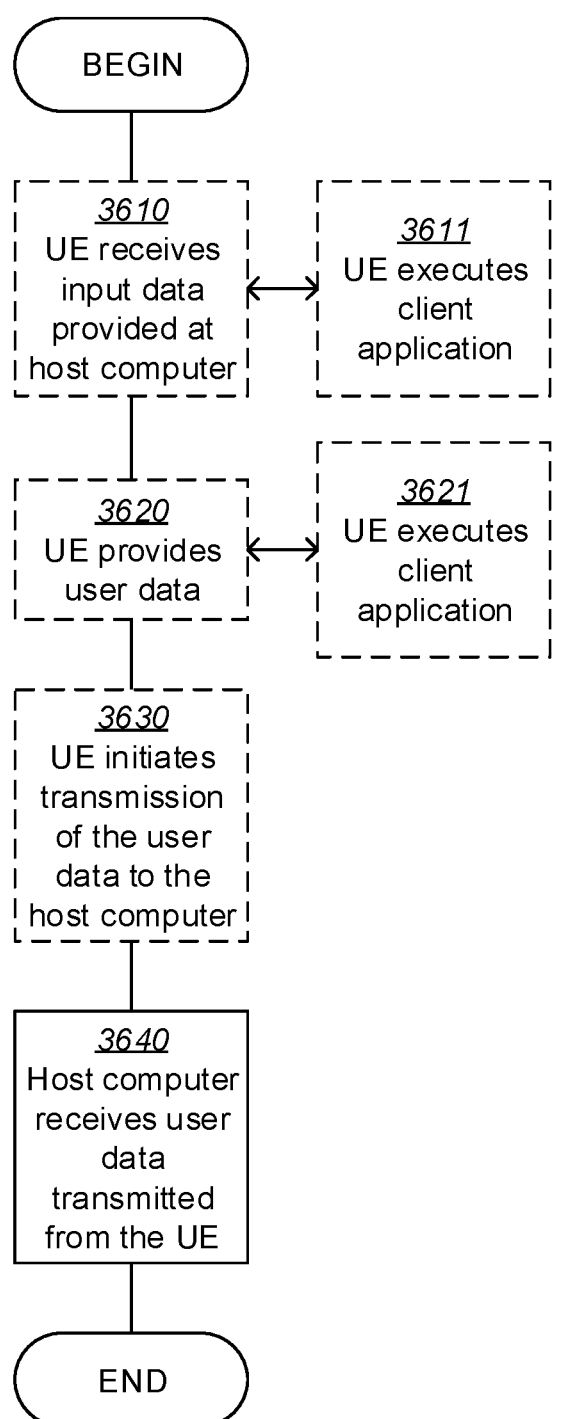

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 14:
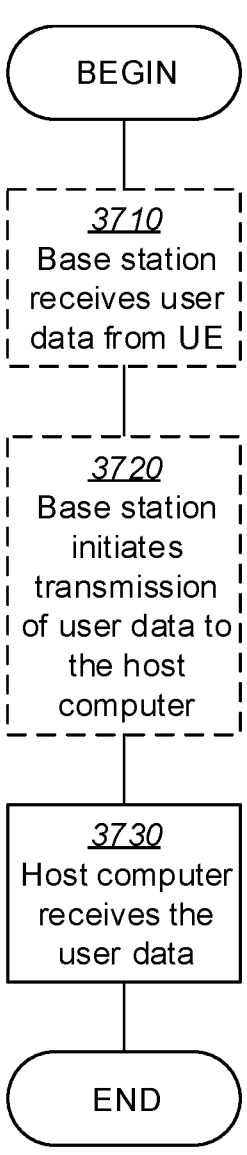

FIG. 14 is a flowchart illustrating a method implemented in a communication system, in accordance with one embodiment. The communication system includes a host computer, a base station such as a AP STA, and a UE such as a Non-AP STA. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

NUMBERED EMBODIMENTS

1. A user equipment (UE) configured to communicate with a base station, the UE comprising a radio interface and processing circuitry configured to performing (501) the first beam training with the first set (S1) of multiple beams (B1-B4);

calculating (502) a channel metric associated with the wireless communications device (121) based on the performed first beam training with the first set (S1);

selecting (503), for the second beam training, a subset (SS2) of beams (B11-B14) of the second set (S2) based on the calculated channel metric; and performing (505) the second beam training with the selected subset (SS2).

2. A communication system including a host computer comprising:

a communication interface configured to receive user data originating from a transmission from a user equipment (UE) to a base station, wherein the UE comprises a radio interface and processing circuitry, the UE's processing circuitry configured to: performing (501) the first beam training with the first set (S1) of multiple beams (B1-B4);

calculating (502) a channel metric associated with the wireless communications device (121) based on the performed first beam training with the first set (S1);

selecting (503), for the second beam training, a subset (SS2) of beams (B11-B14) of the second set (S2) based on the calculated channel metric; and performing (505) the second beam training with the selected subset (SS2).

3. The communication system of embodiment 2, further including the UE.

4. The communication system of embodiment 3, further including the base station, wherein the base station comprises a radio interface configured to communicate with the UE and a communication interface configured to forward to the host computer the user data carried by a transmission from the UE to the base station.

5. The communication system of embodiment 3 or 4, wherein:

the processing circuitry of the host computer is configured to execute a host application; and the UE's processing circuitry is configured to execute a client application associated with the host application, thereby providing the user data.

6. The communication system of embodiment 3 or 4, wherein:

the processing circuitry of the host computer is configured to execute a host application, thereby providing request data; and the UE's processing circuitry is configured to execute a client application associated with the host application, thereby providing the user data in response to the request data.

7. A method implemented in a user equipment (UE), comprising performing (501) the first beam training with the first set (S1) of multiple beams (B1-B4);

calculating (502) a channel metric associated with the wireless communications device (121) based on the performed first beam training with the first set (S1);

selecting (503), for the second beam training, a subset (SS2) of beams (B11-B14) of the second set (S2) based on the calculated channel metric; and performing (505) the second beam training with the selected subset (SS2).

8. The method of embodiment 7, further comprising: providing user data; and forwarding the user data to a host computer via the transmission to the base station.

9. A method implemented in a communication system including a host computer, a base station and a user equipment (UE), the method comprising:

at the host computer, receiving user data transmitted to the base station from the UE, wherein the UE performing (501) the first beam training with the first set (S1) of multiple beams (B1-B4);

calculating (502) a channel metric associated with the wireless communications device (121) based on the performed first beam training with the first set (S1);

selecting (503), for the second beam training, a subset (SS2) of beams (B11-B14) of the second set (S2) based on the calculated channel metric; and performing (505) the second beam training with the selected subset (SS2).

10. The method of embodiment 10, further comprising:

at the UE, providing the user data to the base station.

11. The method of embodiment 10, further comprising:

at the UE, executing a client application, thereby providing the user data to be transmitted; and at the host computer, executing a host application associated with the client application.

12. The method of embodiment 10, further comprising:

at the UE, executing a client application; and at the UE, receiving input data to the client application, the input data being provided at the host computer by executing a host application associated with the client application, wherein the user data to be transmitted is provided by the client application in response to the input data.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method, performed by a wireless communications device, for beam training with a radio access network of a wireless communications system, wherein the wireless communications device is configured with a first set of multiple beams for a first beam training and a second set of multiple beams for a second beam training and wherein the second set is different from the first set, the method comprising:

performing the first beam training with the first set of multiple beams;

calculating a channel metric associated with the wireless communications device based on the performed first beam training with the first set;

selecting, for the second beam training, a subset of beams of the second set based on the calculated channel metric and a learned function relating the channel metric to the subset beams of the second set; and performing the second beam training with the selected subset;

the method further comprises a learning phase comprising:

performing multiple first beam trainings with a first learning set of multiple beams;

performing multiple second beam trainings with a second learning set of multiple beams; each beam training with the second learning set corresponding to a respective beam training with the first learning set; and computing the learned function based on a supervised learning algorithm and based on a training data set comprising multiple instances of:

a channel metric associated with the wireless communications device and based on the respective first beam training with the first learning set in the learning phase and a corresponding indication of beam quality of a respective beam out of one or more beams of the second learning set based on the respective second beam training in the learning phase with the second learning set.

2. The method according to a claim 1, wherein the channel metric comprises a spatio-temporal channel fingerprint, wherein the spatio-temporal channel fingerprint comprises one or more spatial and/or temporal characteristics of a wireless propagation channel used for the first beam training with the first set.

3. The method according to claim 1, wherein the function relates the channel metric to an estimated measure of a beam quality of the respective beam of the subset of beams and wherein selecting the subset of beams is further based on the estimated measure of the beam quality.

4. The method according to claim 1, wherein the second beam training with the subset comprises: measuring beam quality of the respective beam of the selected subset.

5. The method according to claim 4, further comprising: terminating measuring beam quality of the respective beam of the selected subset in response to a measured beam quality fulfilling a beam quality criterion.

6. The method according to claim 1, wherein the first set is associated with a first Radio Access Technology, RAT, and the second set is associated with a second RAT which differs from the first RAT and/or wherein the first set is associated with a first frequency range, and the second set is associated with a second frequency range, wherein the second frequency range differs from the first frequency range.

7. The method according to claim 1, wherein calculating the channel metric is based on baseband processing of one or more reference signals received with the first set during the first beam training with the first set.

8. The method according to claim 1, wherein selecting the subset is performed in response to a constraint on power consumption of the wireless communications device or a constraint on dedicated radio access resources used for beam training.

9. The method according to claim 1, further comprising determining to not buffer second reference signals received on beams of the second set which were not selected for beam training.

10. The method according to claim 5, further comprising, in response to the measured beam quality meeting the beam quality criterion, reducing a supplied power to at least a part of an antenna circuitry associated with beam training on beams of the second set which were not selected for the second beam training.

11. The method according to claim 1, wherein selecting the subset of beams out of the second set is further based on a cardinality of a high-quality subset of beams of the first set, wherein the high-quality subset comprises beams meeting a high-quality beam quality criterion.

12. The method according to claim 1, wherein the second set of multiple beams comprises combinations of beams comprised in a codebook, and wherein selecting the subset of beams out of the second set of multiple beams comprises selecting a subset of the combinations of beams comprised in the codebook.

13. The method according to claim 1, wherein the beams of the first set and the beams of the second set are receive beams.

14. A wireless communications device for beam training with a radio access network of a wireless communications system, wherein the wireless communications device is configured with a first set of multiple beams for a first beam training and a second set of multiple beams for a second beam training and wherein the second set is different from the first set, wherein the wireless communications device comprises a processing module, which is further configured to: perform the first beam training with the first set of multiple beams; calculate a channel metric associated with the wireless communications device based on the performed beam training with the first set; select, for the second beam training, a subset of beams of the second set based on the calculated channel metric and a learned function relating the channel metric to the subset of beams of the second set; and perform the second beam training with the selected subset the wireless communications device is further configured to, during a learning phase, to: perform multiple first beam trainings with a first learning set of multiple beams; perform multiple second beam trainings with a second learning set of multiple beams; each beam training with the second learning set corresponding to a respective beam training with the first learning set; and compute the learned function based on a supervised learning algorithm and based on a training data set comprising multiple instances of: a channel metric associated with the wireless communications device and based on the respective first beam training with the first learning set in the learning phase and a corresponding indication of beam quality of a respective beam out of one or more beams of the second learning set based on the respective second beam training in the learning phase with the second learning set.

*    *    *    *    *